United States Patent [19]

Takahashi et al.

[11] Patent Number: 5,671,451
[45] Date of Patent: Sep. 23, 1997

[54] DATA-RECORDING UNIT IN USE WITH A CAMERA

[75] Inventors: Yoshiharu Takahashi; Minoru Yamada; Yoshiyuki Nojima; Yasutoshi Fujii, all of Hachioji, Japan

[73] Assignee: Konica Corporation, Tokyo, Japan

[21] Appl. No.: 633,052

[22] Filed: Apr. 16, 1996

[30] Foreign Application Priority Data

Apr. 18, 1995 [JP] Japan .................................. 7-092379

[51] Int. Cl.⁶ .............................. G03B 17/24; G03B 29/00
[52] U.S. Cl. ........................ 396/310; 396/315; 396/429
[58] Field of Search ........................... 342/357; 354/105, 354/106; 396/310, 315, 429

[56] References Cited

U.S. PATENT DOCUMENTS

| | | | |
|---|---|---|---|
| 5,220,509 | 6/1993 | Takemura et al. | 364/449 |
| 5,296,884 | 3/1994 | Honda et al. | 354/106 |
| 5,335,072 | 8/1994 | Tanaka et al. | 348/232 |
| 5,400,254 | 3/1995 | Fujita | 364/449 |
| 5,422,814 | 6/1995 | Sprague et al. | 364/449 |
| 5,450,329 | 9/1995 | Tanner | 364/449 |
| 5,461,338 | 10/1995 | Applegate et al. | 342/357 |
| 5,469,360 | 11/1995 | Ihara et al. | 364/449 |
| 5,483,456 | 1/1996 | Kuwahara et al. | 364/449 |
| 5,488,558 | 1/1996 | Ohki | 364/449 |
| 5,488,559 | 1/1996 | Seymour | 364/449 |
| 5,506,644 | 4/1996 | Suzuki et al. | 354/106 |
| 5,508,736 | 4/1996 | Cooper | 348/144 |
| 5,528,248 | 6/1996 | Steiner et al. | 342/357 |

*Primary Examiner*—Michael L. Gellner
*Assistant Examiner*—Daniel Chapik
*Attorney, Agent, or Firm*—Finnegan, Henderson, Farabow, Garrett & Dunner, L.L.P.

[57] ABSTRACT

A data recording unit in use with a camera for recording information data, obtained through a GPS receiver, on a photographing film. The data recording unit includes: a selector for selecting a geodetic system from plural geodetic systems; a data converter for converting position information data, obtained through the GPS receiver, to converted position information data in the geodetic system which is selected by the selector; and a printing LED for recording the converted position information data on the photographic film together with images photographed by the camera.

8 Claims, 14 Drawing Sheets

| SYMBOLS | GEODETIC SYSTEMS | STANDARD SLLIPSOID | COUNTRY NAMES |
|---|---|---|---|
| A | WGS-84 | WGS-84 | WHOLE WORLD |
| B | TOKYO | Bessel 1841 | JAPAN KOREA |
| C | ADINDAN | Clarke 1880 | ETHIOPIA SUDAN |
| D | ARC 1950 | Clarke 1880 | ZAIRE ZAMBIA |
| | CAPE | Clarke 1880 | SOUTH AFRICA |
| E | MERCHICH | Clarke 1880 | MOROCCO |
| F | HONGKONG 1963 | International | HONG KONG |

DATA-RECORDING UNIT IN USE WITH A CAMERA

BACKGROUND OF THE INVENTION

The present invention relates to a data-recording unit in a camera capable of recording various pieces of information together with photographed images, and more particularly to a data-recording unit in use with a camera related to a camera having therein a function of information recording capable of recording, on a recording medium such as a film, photographing-state-related information of a camera relevant to photographing state such as a photographing position of a camera and photographing time and photographing-related information of a camera related to photographing drive control of a camera, together with photographed images, by the use of a satellite positioning system represented by GPS (Global Positioning System) and various sensors, and capable of selecting a desired geodetic system from some geodetic systems and recording data converted to the selected geodetic system when recording position information obtained by GPS reception signals as photographing position information of a camera, in particular.

In recent years, there have been increased occasions wherein various kinds of cameras are used by an individual, a traveler, a photographer and others. In addition, development of machines and equipment handling GPS data (position information) has been accelerated by advancement of car navigation. In synchronization with this, there have recently been proposed cameras wherein information such as latitude, longitude, altitude and time are obtained as photographing-related information of a camera by utilizing GPS adopted as a car navigation system for a car, and these information are recorded on a film together with images.

For example, Japanese Patent Publication Open to Public Inspection No. 247081/1991 (hereinafter referred to as Japanese Patent O.P.I Publication) discloses a camera which calculates an absolute position of a photographing location from position measurement data such as latitude, longitude and altitude obtained from a GPS receiver, and selects plural place names stored in a discrimination means based on the absolute position. Further, Japanese Patent O.P.I. Publication No. 70724/1992 discloses a camera which records automatically position measurement data obtained from a GPS receiver on a recording medium such as a film or a memory together with photographed images, while Japanese Patent O.P.I. Publication No. 67291/1994 discloses a camera which detects position information from a GPS receiver and corrects time information based on the obtained position information.

(1) A shape of the earth is represented by a rotary ellipsoid which is slightly distorted. Therefore, when obtaining accurately, at each location, position measurement data corresponding to a map, it is necessary to define (establishment of a geodetic system) a rotary ellipsoid representing that location most accurately and to determine latitude, longitude and altitude. On the other hand, a geodetic system adopted by GPS is one called WGS-84, and it covers the whole area on the earth. However, the WGS-84 system has a disadvantage that it has a slight difference depending on each area mentioned above. Therefore, in order to obtain position measurement data of a photographing point which is more accurate, it is necessary to employ a geodetic system capable of determining the area to be used more accurately and to convert to the data of that geodetic system.

FIG. 14 is a table showing a part of examples of various geodetic systems. For example, a symbol of WGS-84 is "A", its standard ellipsoid is WGS-84 and an area to which the WGS-84 is applied is the whole world. However, the WGS-84 has the problems mentioned above. In the case of a geodetic system of TOKYO, its symbol is "B", its standard ellipsoid is Bassel 1841 and country names of its application area are Japan and Korea. The same shall apply hereinafter.

(2) When it is impossible to identify the geodetic system through which the recorded data were recorded, there is caused a problem that reliability of data is lost in the subsequent processing.

(3) Further, it is troublesome to establish the selection of a geodetic system and local time separately, and there is a possibility of misuse.

SUMMARY OF THE INVENTION

The invention has been achieved with the above-mentioned problem as a background, and its object is to offer a data recording unit in a camera wherein recorded data can correspond surely to its relevant geodetic system.

The first example to solve the problem mentioned above is represented by a data recording unit in use with a camera capable of recording information data obtained through a GPS receiver on a recording medium together with photographed images wherein a data conversion means that converts position information data obtained through the GPS receiver to position information data in a geodetic system, a geodetic system selection means that selects a geodetic system from plural geodetic systems, and a recording means that records position information data converted by the data conversion means based on the geodetic system selected by the geodetic system selection means are provided.

In this case, it is preferable to provide a geodetic system information outputting means that outputs geodetic system information of the geodetic system selected by the geodetic system selection means and to record the geodetic system information by the recording means together with the position information data, for making the recorded data to correspond surly to the geodetic system.

Furthermore, for comparing and contrasting between position information and the geodetic system, it is preferable to provide a display means that displays at least one of the geodetic system selected by the geodetic system selection means and data-converted position information.

The second example to solve the problem mentioned above is represented by a data recording unit in use with a camera capable of recording information obtained through a GPS receiver on a recording medium together with photographed images wherein a reception information outputting means that outputs position information data and GPS time information according to the signals received by a GPS receiver, an area information setting means that sets area information, a time information conversion means that converts the time information obtained by a GPS receiver to local time of the area, corresponding to the area which is set by the area information setting means, a time information outputting means that outputs corrected time information obtained by the time information conversion means, a data conversion means that converts the position information data obtained by the GPS receiver to a position information in the other geodetic system data, a conversion position information outputting means that outputs position information obtained by the data conversion means, and a recording means that record information in various kinds are provided, and time information corrected by a time information outputting means is outputted corresponding to the area set by the area information setting means and conversion position information based on the geodetic system corresponding to the area set by a conversion position information outputting means is outputted so that they are recorded by the above-mentioned recording means.

In this case, when an area is set by the area information setting means, both corrected time information and conversion position information are displayed, while when the area information is not set, it is preferable to provide a display means that displays position information based on both the GPS time information and WGS-84 for displaying both the time information and position information so that they correspond to each other.

The third example to solve the problem mentioned above is represented by a data recording unit in use with a camera capable of recording information obtained through a GPS receiver on a recording medium together with photographed images wherein there are provided a reception information outputting means that outputs position information with signals received by a GPS receiver, an area information setting means that sets area information or a geodetic system selection means for selecting a geodetic system, a comparison means that compares the area set or selected by the area information setting means for setting area information or by the geodetic system selection means with the aforementioned reception position information, and a warning means that warns when there is a big difference between the set or selected area and the reception position information.

In this case, it is preferable, for the purpose of warning a user surely, that the warning means mentioned above warns either by displaying a warning message or by making a warning sound.

Further, for the purpose of preventing the photographing under the wrong geodetic system, it is preferable that the above-mentioned warning means warns by prohibiting a photographing operation of a camera.

FIRST EXAMPLE

Position information data converted by the data conversion means mentioned above is recorded by a recording means based on geodetic system selected by the aforementioned geodetic system selection means, which makes it possible to record with geodetic system data of each location.

In this case, it is possible to make the recorded data to correspond surly to the geodetic system by providing a geodetic system information outputting means that outputs geodetic system information of the geodetic system selected by the aforesaid geodetic system selection means and by recording geodetic system information of the geodetic system selected by the aforesaid geodetic system selection means together with position information by the recording means.

In addition, it is possible to compare and contrast between position information and the geodetic system by providing a display means that displays at least one of the geodetic system selected by the geodetic system selection means and data-converted position information.

SECOND EXAMPLE

Time information corrected by a time information outputting means is outputted corresponding to the area set by the area information setting means and conversion position information based on the geodetic system corresponding to the area set by a conversion position information outputting means is outputted so that they are recorded by the above-mentioned recording means, which makes it possible to make the recorded data (corrected time information and converted position information) to correspond surly to the geodetic system.

In this case, it is possible to display both the time information and position information so that they correspond to each other by displaying both corrected time information and conversion position information when an area is set by the area information setting means, and by providing a display means that displays position information based on both the GPS time information and WGS-84 when the area information is not set,

THIRD EXAMPLE

A comparison means that compares the area set or selected by an area information setting means or by a geodetic system selection means with the position information obtained by a GPS receiver, and a warning means that warns when there is a big difference between the set or selected area and the position information are provided. Owing to this, when the area differs substantially from the reception position information, a warning means warns to prevent selection of the wrong area.

In this case, it is possible for the aforesaid warning means to let a user know surely about the wrong use by warning in the manner of either displaying a warning message or making a warning sound.

Further, it is possible to prevent the photographing under the wrong geodetic system, when the aforementioned warning means warns in the manner of prohibiting a photographing operation of a camera.

BRIEF DESCRIPTION OF THE DRAWINGS

FIGS. 6(a) through 6(d) present illustrations showing examples on the display sections.

FIG. 14 is a table showing examples of geodetic systems in various kinds.

DETAILED DESCRIPTION OF THE PREFERRED EMBODIMENT

Figure 1:
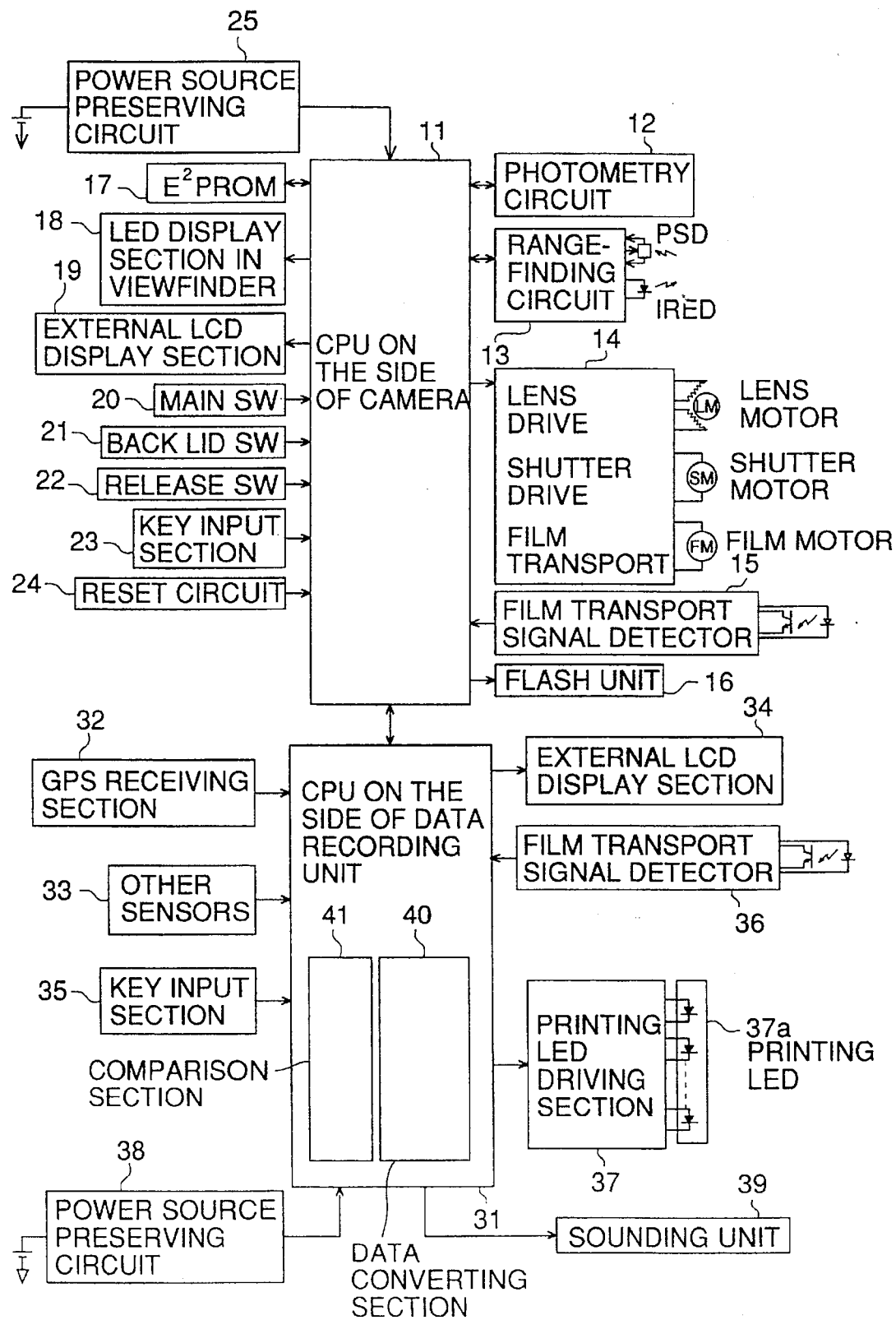
FIG. 1 is a structural block diagram showing an example of the invention.

Examples of the invention will be explained in detail as follows, referring to the drawings.

Figure 2A:
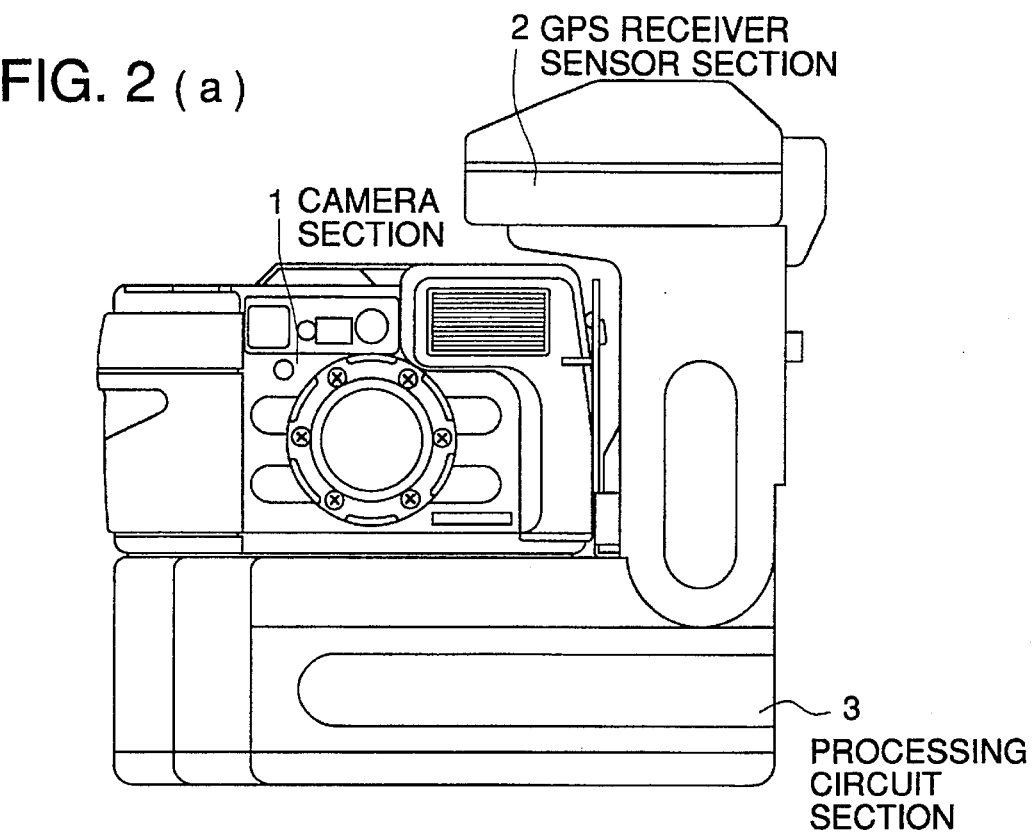
FIGS. 2(a) and 2(b) are illustrations showing an external structural example of the invention.
Figure 2B:
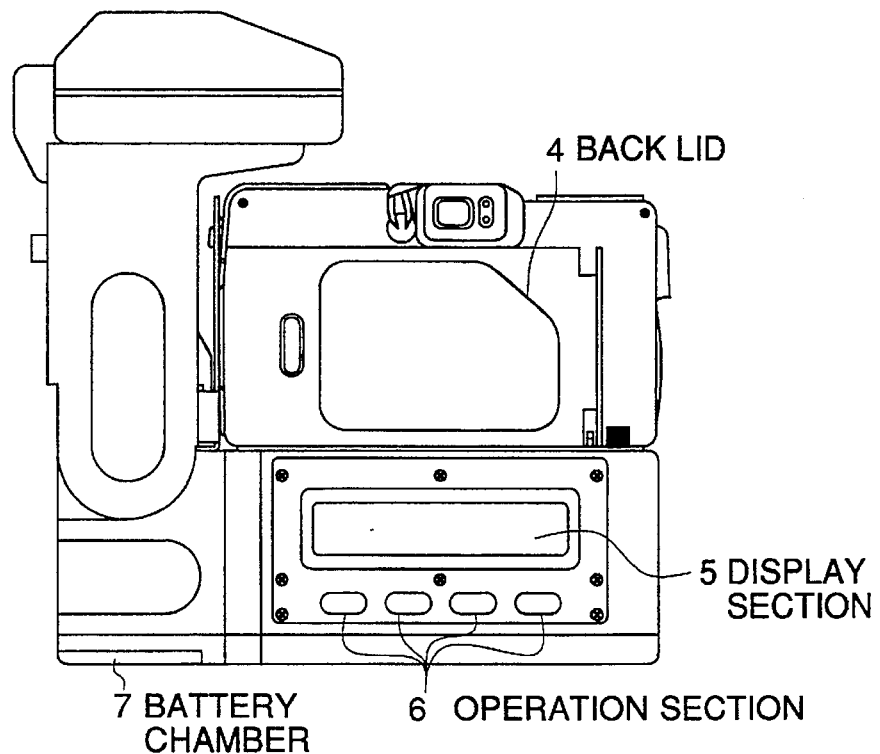

FIG. 1 is a structural block diagram showing an example of the invention and FIGS. 2(a) and 2(b) is an illustration showing an example of external constitution of the invention. FIG. 2(a) represents a front view and FIG. 2(b) represents a rear view. In this example, the invention is applied to a camera wherein a film is a recording medium. Incidentally, the invention is not limited to the foregoing, and it can also be applied to other cameras employing other recording media such as those using magnetism, photo-disks and fixed memories.

In FIGS. 2(a) and 2(b) the numeral 1 is a camera section conducting photographing and recording, 2 represents a GPS receiver and other sensors, and 3 is a processing circuit section that processes position information and time information both obtained from the GPS receiver. The numeral 4 is a back lid housing therein a detecting section for film movement and a data printing section, 5 is a display section that displays various kinds of information, 6 is an operation section that gives various instructions to an apparatus, and 7 is a battery chamber.

An example in FIG. 1 includes those inputted in CPU 11 on the side of a camera (hereinafter referred to as CPU 1) and processed therein and those inputted in CPU 31 on the side of a data recording unit (hereinafter referred to as CPU 2) and processed therein. On the side of a camera, 12 is a photometry circuit that measures a quantity of light, 13 is a range-finding circuit that measures a subject distance and it contains IRED (infrared emitting LED) that emits light toward a subject and PSD that receives light reflected from the subject.

The numeral 14 represents various driving sections which are equipped with lens driving function, shutter driving function and film transport function. LM represents a lens motor driven by the lens driving function, SM represents a shutter motor driven by the shutter driving function, and FM represents a film motor driven by the film transporting function.

The numeral 15 is a first film transport signal detector that detects an amount of transport for one frame of a film, and it detects one frame of a film by counting the number of perforations on the film, and thereby outputs film transport signals. The numeral 16 is a flash unit, 17 is $E^2PROM$ wherein data of automatic focusing and automatic exposure adjustment are stored, 18 is an LED display section where a focused state is indicated in a viewfinder (F), 19 is an LCD display section where the number of exposures and a flash mode are displayed, 20 is a main switch (SW), 21 is a back lid switch (SW) that detects that the back lid is closed, 22 is a release switch (SW), 23 is a key input section that inputs a photographing mode, 24 is a reset circuit that resets a circuit to an initial state, and 25 is a power source preserving circuit that preserves power source to be supplied to a circuit. The external LCD display section 19 is provided on the top of the camera section 1 (see FIG. 2), for example..

The back lid switch 21 conducts film auto-loading after detecting that the back lid is closed. Constituents needed for the foregoing are connected to CPU 1. A sequence program for a camera operation is stored in a memory provided in the CPU 1. The CPU 1 on the side of a camera and various constituents connected to the CPU 1 are used for an ordinary camera operation and are materialized by prior art, therefore, explanation of their operations is omitted here.

Next, constitution on the side of CPU 31 (hereinafter referred to as CPU 2) on the side of a data recording unit will be explained. CPU 2 is connected to CPU 1 on the side of a camera, and information is transmitted reciprocally between them. On the side of a data recording unit, 32 is a GPS receiver, and CPU 2 receives reception data from the GPS receiver 32, namely, time information and position information both from GPS. The numeral 33 is a section of other various sensors that measures an azimuth, an elevation angle and others. The CPU 2 receives information from the various sensors section 33. These GPS receiver 32 and various sensors section 33 correspond to GPS receiver-sensor section 32 in FIG. 2.

The numeral 34 is an external LCD display section (corresponding to display section 5 in FIG. 2) that displays information described above. The numeral 35 is a key input section where various operation information are inputted, and it designates contents to be recorded in a data recording unit which will be explained later. The numeral 36 is a second film transport signal detector which detects film transport signals, and it detects a delicate amount of a movement of a film while the film is being transported, and thereby outputs film transport signals 2.

The numeral 37 is a printing LED driving section, and it drives printing LED 37a. The printing LED 37a is composed of 7 LED elements arranged on a one-dimensional basis to be perpendicular to the film transport direction, and it emits light selectively depending on detection output of film transport signal detector 36 to record characters or symbols in a matrix form in a recording area on a film.

The numeral 38 is a power source preserving circuit that preserves voltage of power source. Constituents relating to the foregoing are connected to CPU 2. The numeral 39 is a sounding unit which serves as a warning means that makes warning sound when the set area information differs substantially from the reception position information. As the sounding unit 39, a buzzer, for example, is used.

The numeral 40 is a data converting section which converts position information obtained from GPS receiver 32 based on the set area information and converts to the local time of the set area based on time information obtained from GPS receiver 32. and the numeral 41 is a comparison section which compares the area obtained from information of the set area or from the selected geodetic system with reception position information, and it is provided in CPU 2. These circuits represent contents of processing circuit 3 in FIG. 2.

Figure 3:
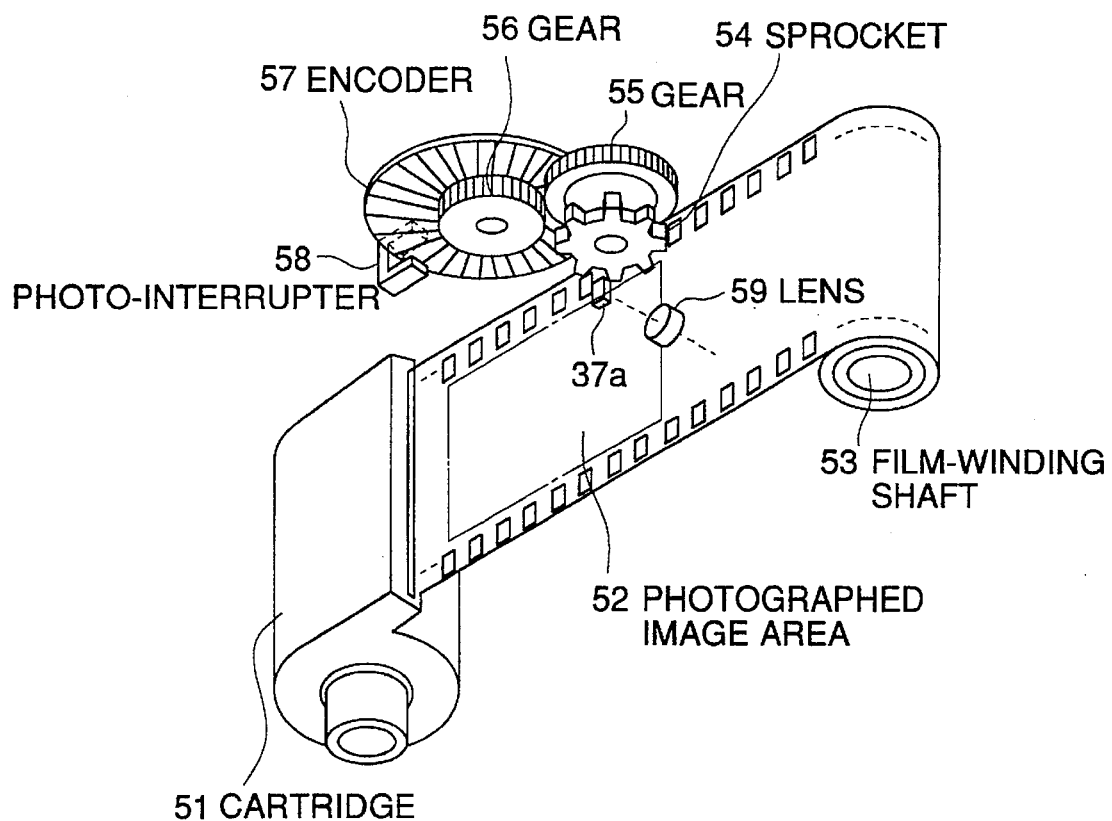
FIG. 3 is an illustration showing an example of structural arrangement of a film transport signal detecting section and a printing LED.

FIG. 3 represents illustrations showing examples of structural arrangement of both a film transport signal detector and a printing LED, and they show outline of second film transport signal detector 36 and printing LED 37a. A film is transported from cartridge 51 to film-winding shaft 53 for each photographing. The numeral 52 is a photographed image area, and film transport signal detector 36 is as follows.

The film transport signal detector 36 is composed of sprocket 54 that rotates when perforations move, gear 55 that rotates to be coaxial with the sprocket 54, gear 56 that is driven by the gear 55 to rotate, encoder 57 that rotates to be coaxial with the gear 56 and photo-interrupter 58 that detects the rotation of the encoder 57. In this case, the encoder 57 is one having a transparent section and an opaque section alternately. However, it can also be one having a reflection section and a non-reflection section alternately, in which the photo-interrupter 58 needs to be changed to a photo-reflector. The sprocket 54 may also be a roller that is rotated by the movement of a film. Output of the photo-interrupter 58 represents output of the second film transport signal detector 36 (film transport signal 2).

Printing LED 37a is an LED drive array on which LEDs are arranged on a one-dimensional basis to be perpendicular to the film movement direction, through which LED images are recorded on a film through printing lens 59. Incidentally, in this example, both film transport signal detector 36 and printing LED 37a are arranged, at the reverse side of a film. However, either one of them or both of them can naturally be arranged at the surface of the film. Operations of a unit having the aforesaid constitution will be explained as follows, referring to a flow chart of them.

Figure 4:
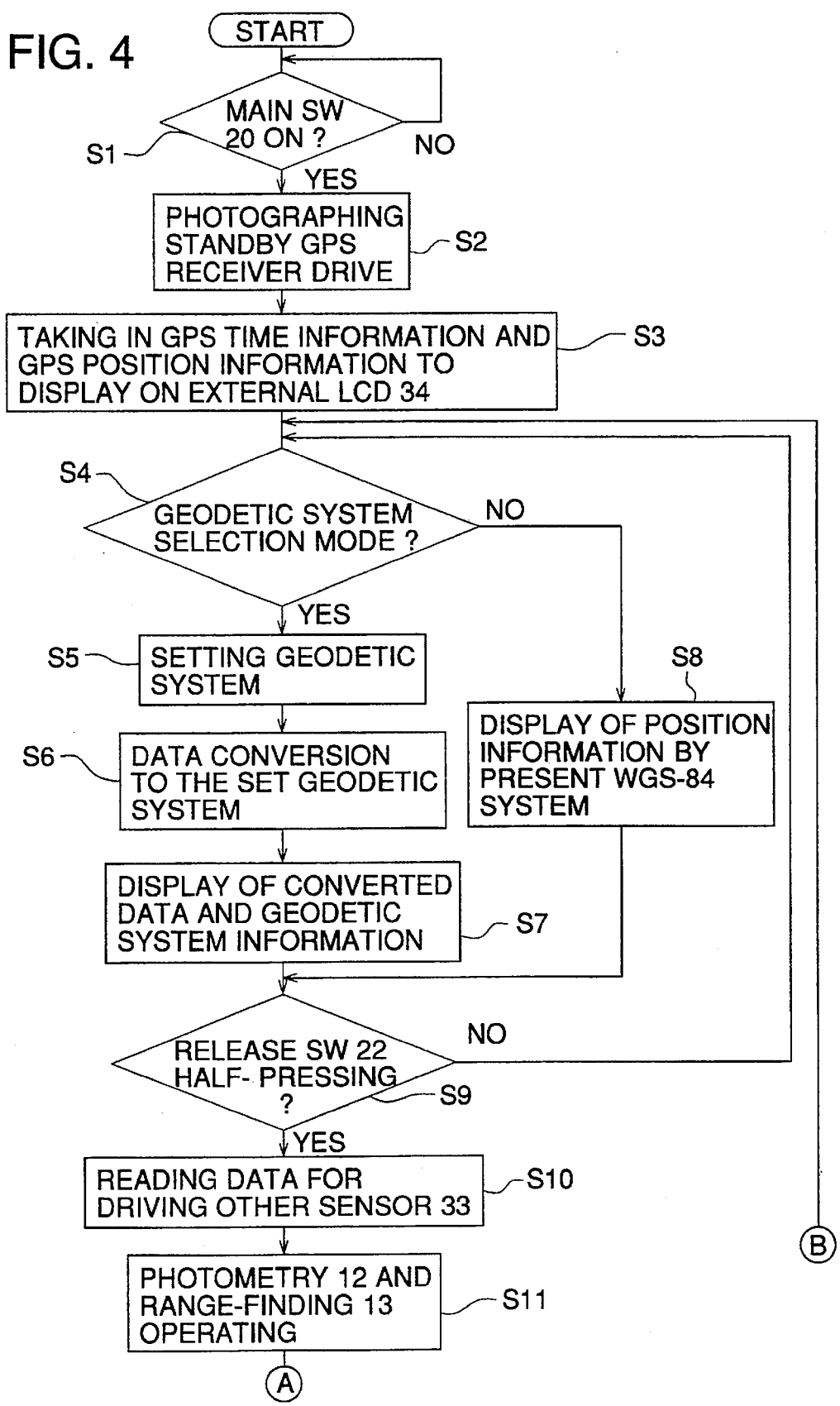
FIG. 4 is a flow chart showing operations of the first example of the invention.
Figure 5:
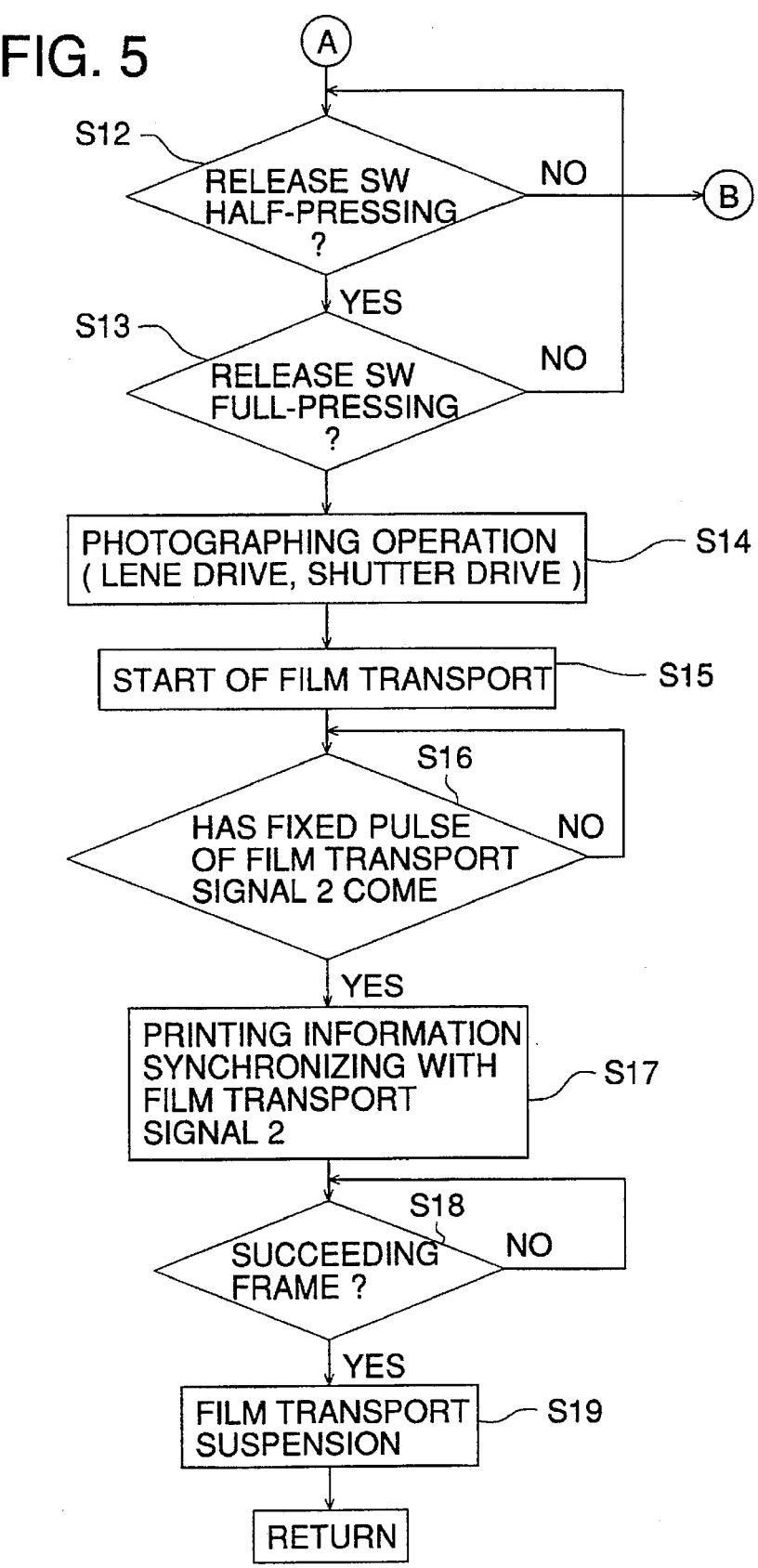
FIG. 5 is a flow chart showing operations of the first example of the invention.

Each of FIGS. 4 and 5 represents a flow chart of operations of an example of the invention. The explanation of them will be made in parallel with that of a display example of LCD display section 34. When main switch 20 of a camera is turned on (S1), charging for a flash unit and other operations are made in the camera, and the camera will be ready for photographing. On the other hand, CPU2 starts driving GPS receiver 32 simultaneously (S2). It takes in information of time and position through an electric wave from a satellite, and displays them on external LCD display section 34 (S3). In this case, the display on the external LCD display section 34 is like that shown in FIG. 6(a). In this display example, time information (9503150512) and latitude information (N354014) are displayed on the upper step, and longitude information (E1392208) and a symbol representing a geodetic system ("A" in this case: see FIG. 14) are displayed on the lower step. The time display indicates 12 minutes past 5 o'clock on Mar. 15, 1995, and the latitude display indicates 35°40'14" N.L. where N represents the north latitude, and the longitude display indicates Long. 139°22'08" E where E represents the east longitude. "A" showing the geodetic system indicates that it is WG-84. (See FIG. 4.)

After this, CPU 2 further checks whether the geodetic system selection mode is selected or not (S4). When the geodetic system selection mode is selected, symbol "A" that shows the geodetic system is caused to flicker as shown in FIG. 6(b) to indicate that the geodetic system selection mode is selected. In this case, when the geodetic system is set, for example, to TOKYO geodetic system (The symbol for geodetic system in this case is B. See FIG. 14.) from key input section 35 (same as operation section 6 in FIG. 2) (S5), data converting section 40 in CPU 2 data-converts position information obtained by GPS receiver 32 based on standard ellipsoid Bessel 1841 coordinate system of the TOKYO geodetic system (S6).

Then, the converted position information data and geodetic system information are displayed on LCD display section 34 (S7). An example in this case is shown in FIG. 6 (c). Latitude information (N354003) and longitude information (E1392221) both at the selected geodetic system are displayed, and symbol "B" representing the geodetic system is displayed. In this case, the latitudinal and longitudinal position information are those obtained by data-converting with the TOKYO geodetic system. Therefore, they are different in terms of value from the position information obtained by WGS-84 system, as shown in FIG. 6(a). By displaying at least one of the selected geodetic system and the data-converted position information, it is possible to compare and consult between the position information and the geodetic system, as stated above.

Incidentally, when the geodetic system selection mode is not selected in step S4, CPU 2 displays position information based on WGS-84 system (geodetic system covering the whole areas on the earth) on LCD display section 34 (S8). Then, it checks whether release switch 22 for photographing a subject is half-pressed or not (S9), and when it is half-pressed, the CPU 2 drives other various sensors 33 to read data of the sensors (S10). Other sensors include, for example, an azimuth sensor and an elevation angle sensor, and these are displayed between latitude information and geodetic system information as shown in FIG. 6(d). The symbol "+03" indicates that the optical axis of the camera is tilted by 3° in terms of positive elevation angle, while "187" indicates the direction of 187° swiveled clockwise from north.

After this, the CPU 2 notifies CPU 1 to operate photometry circuit 12 and range-finding circuit 13 (S11). Then it checks whether release switch 22 is half-pressed or not (S12). When it is not half-pressed, the sequence returns to step S4 to start again from area setting. When it is half-pressed, the release switch 22 is pressed fully (S13) to photograph a subject (S14). In this case, the CPU 1 drives various driving sections 14 to conduct lens drive and shutter drive.

After this, the CPU 1 starts film transport (S15). In this case, CPU 2 receives prescribed pulses required for a printing position in photographed image area 52 (see FIG. 2) to arrive at a printing optics system to count them, and after receiving prescribed pulses (S16), the CPU 2 prints, in synchronization with film transport signals 2, the contents displayed on LCD display section 34, namely, information of local time of a specific location, latitude information, longitude information, elevation angle information, azimuth angle information and geodetic system information, in this order, on a recording area on a film from printing LED 37a (S 17). After this, the film is transported further to be checked whether the following frame comes to a photographing position or not (S18). When detecting the following frame by means of an output of film transport signal detecting section 15, the CPU 1 stops film transport. The foregoing represents a photographing operation for one frame.

As explained above, it is possible to make the recorded data (position information in this particular case) and the geodetic system to correspond surely to each other, in the first example. It is also possible to make the recorded data and the geodetic system to correspond surely to each other by recording the selected geodetic system information on a film together with position information.

Figure 7:
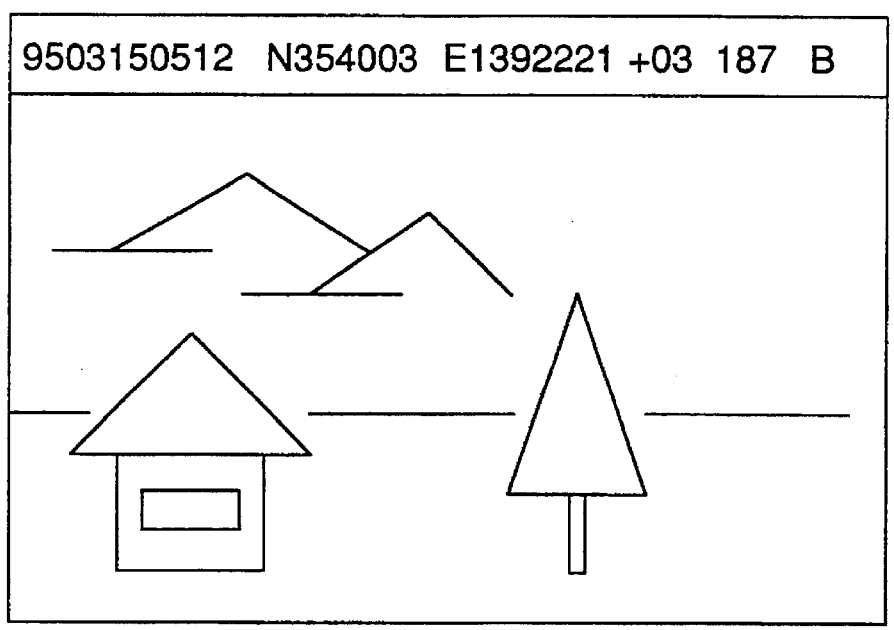
FIG. 7 is an illustration showing examples of photographic images recorded.

FIG. 7 is an illustration showing examples of recorded photographic images photographed (recorded) by the use of the first example. Over the ordinary subject image, there are recorded various information such as photographing time of 12 minutes past 5 o'clock on the 15th day of Mar. in 1995, latitude information of 35°40'03" N (north latitude), longitude information of 139°22'21" E (east longitude), elevation angle of +3°, azimuth angle of 187° and TOKYO geodetic system symbol of "B". From these examples of recorded photographic images, it is understood that conversion of position information based on TOKYO geodetic system is conducted on information obtained from GPS receiving section 32. According to this example, it is possible to make the recorded data (position information) and the geodetic system to correspond surely to each other.

Figure 8:
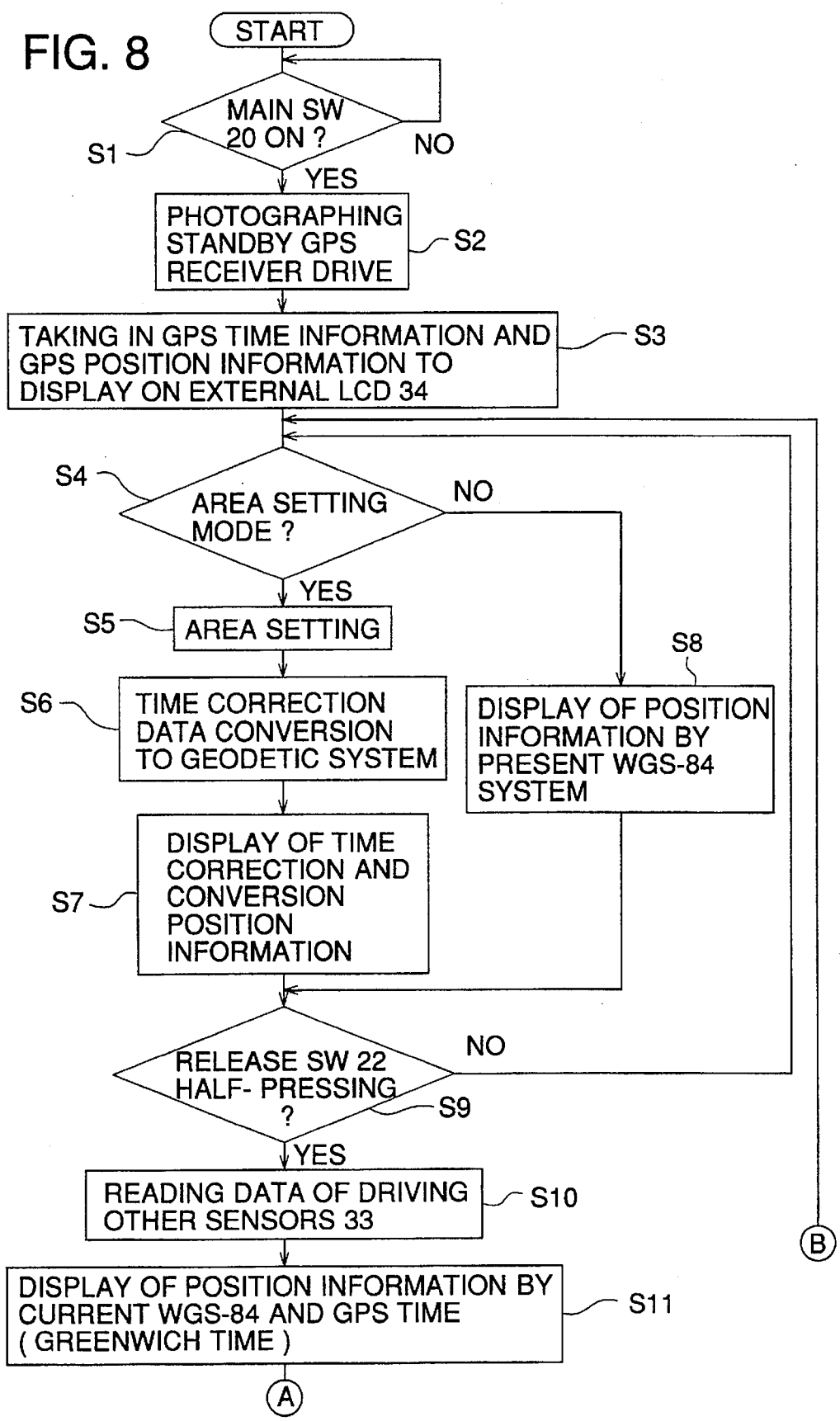
FIG. 8 is a flow chart showing operations of the second example of the invention.
Figure 9:
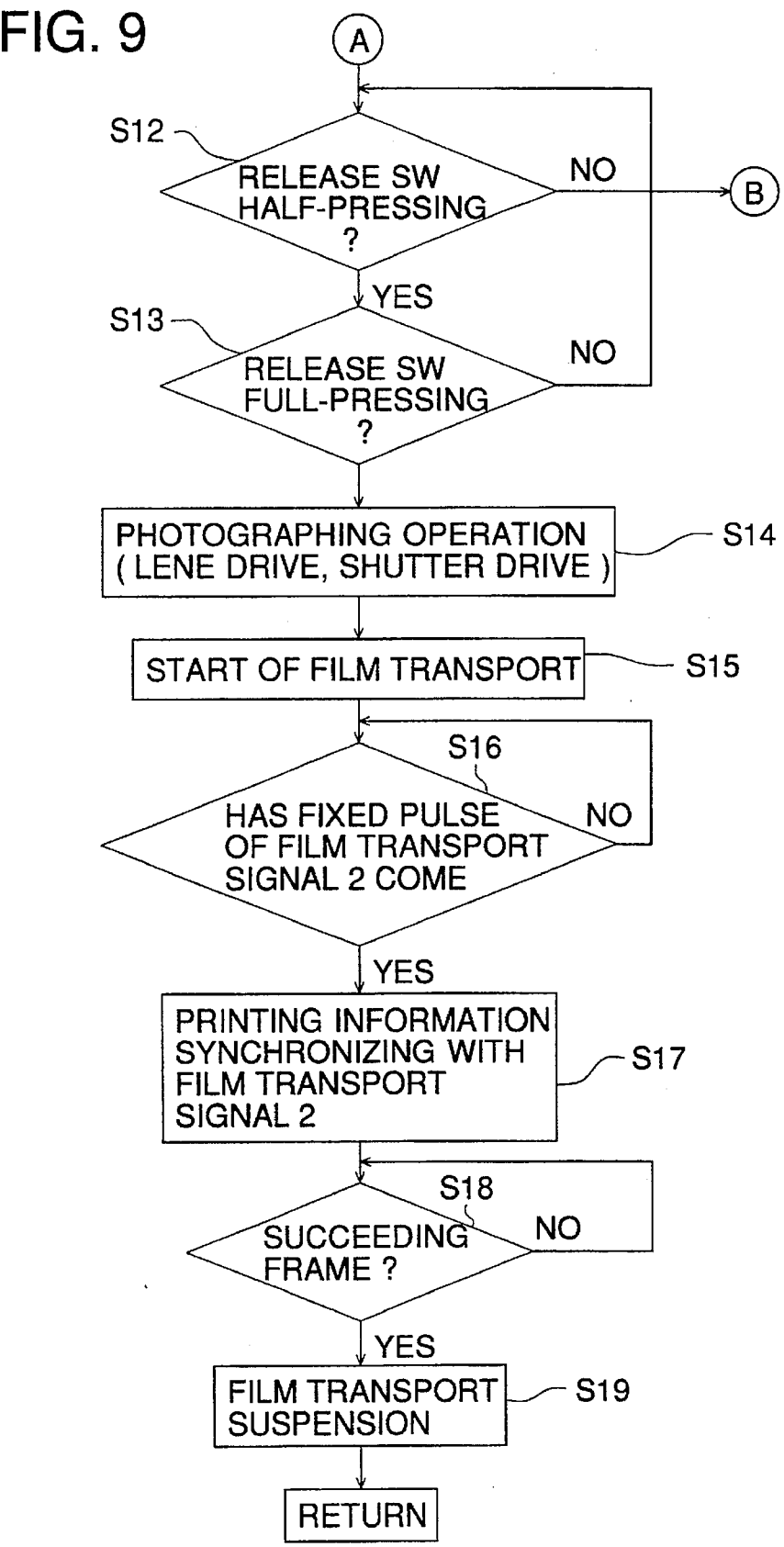
FIG. 9 is a flow chart showing operations of the second example of the invention.

Each of FIGS. 8 and 9 represents a flow chart showing operations of the second example of the invention. This will be explained as follows, in parallel with an explanation of examples of displays on LCD display section 34. When main switch 20 of a camera is turned on (S1), a camera performs flash charging and other operations to be ready for photographing. On the other hand, CPU 2 starts driving GPS receiving section 32 simultaneously (S2). Then, it receives electric waves from a satellite to take in information of time and position, and displays them on outer LCD display section 34 (S3). In this case, on the outer LCD display section 34, there are displayed as shown in FIG. 10(a). In this display example, time information (9503150512) and latitude information (N354014) are displayed in the upper step, while longitude information (E1392208) is displayed in the lower step. The time display indicates 12 minutes past 5 o'clock on the 15th day of Mar. in 1995, latitude display indicates 35°40'14" with N which represents the north latitude, and longitude display indicates 139°22'08" with E which represents the east longitude. Incidentally, the geodetic system in this case is WGS-84.

After this, the CPU 2 checks whether the area setting mode is selected or not (S4). When the area setting mode is selected, a space is caused to flicker as shown in FIG. 10(b). Here, for example, area information is set to Japan (geodetic system symbol in this case is "B". see FIG. 14) from key input section 35 (same as operation section 6 in FIG. 2) (S5). Data converting section 40 converts time information into that in Japan based on information received from GPS receiving section 32. It further converts information obtained by GPS receiving section 32, based on a coordinate system of Bessek 1841 which is a standard ellipsoid of TOKYO geodetic system "B" (S6). Then, corrected time information, converted position information data and geodetic system information are displayed on LCD display section (S7).

Figure 10:
FIGS. 10(a) through 10(d) represent illustrations showing other examples on the display sections.

In this case, display on the LCD display section 34 is like that shown in FIG. 10(c). Namely, with regard to display of time, Greenwich time (9503150512) shown in FIG. 10 (a) has been converted to Japan time (9503151412), and position information (N354003) and (E1392221) obtained through conversion from the value obtained from WGS-84 to that of TOKYO geodetic system are displayed. Owing to this, local time information at the photographing location, position information obtained through conversion to that of the local geodetic system at the photographing location and the geodetic system corresponding thereto are displayed. Therefore, it is possible to make the recorded data (corrected time information position information) and the geodetic system to correspond surely to each other.

Incidentally, when a area setting mode is not selected in step S4, CPU 2 displays both position information based on WGS-84 and GPS time (Greenwich time) (S8). According to the second example, when the area is set, corrected time information and converted position information are displayed, while when the area information is not set, GPS time information and GPS position information based on WGS-84 are displayed on LCD display section 34, which makes it possible to display through correspondence between time information and position information.

Since the operations after that are the same as those in the first example shown in FIGS. 4 and 5, explanation therefor will be omitted. FIG. 10(d) shows how information obtained from various sensors 33 with release switch 22 being half-pressed in step S9 are displayed on LCD display section 34. Measurement values of an azimuth sensor and an elevation angle sensor are displayed on a space between longitude information and geodetic system information in the lower step on LCD display section 34. The symbol "+03" indicates that the optical axis of the camera is tilted by 3° in terms of positive elevation angle, while "187" indicates the direction of 187° swiveled clockwise from north.

Figure 11:
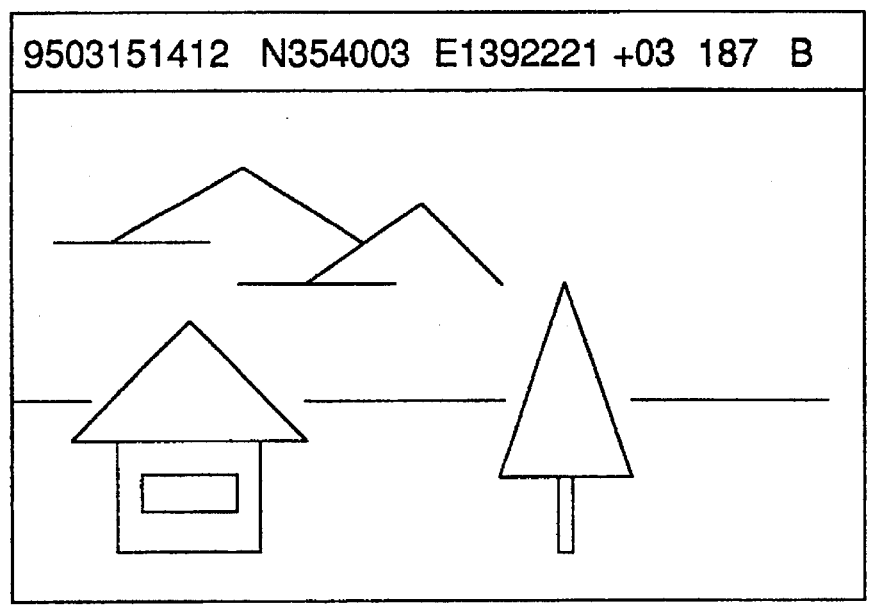
FIG. 11 is an illustration showing other examples of photographic images recorded.

FIG. 11 is an illustration showing examples of recorded photographic images photographed (recorded) by the use of the second example. What is different from the occasion of the first example shown in FIG. 7 is that time information is recorded after being corrected to the local time. Since the geodetic system is recorded as "B", Japan time which is 12 minutes past 2 o'clock in the afternoon of March in 1995 is indicated. It is understood that 9503150512 shown in FIG. 7 is corrected by adding 9 hours thereto to 9503151412 to be displayed because Japan time is ahead of Greenwich time by 9 hours.

As explained above, it is possible to make the recorded data (time information and position information in this particular case) and the geodetic system to correspond surely to each other, in the second example. It is also possible to make the recorded data and the geodetic system to correspond surely to each other by recording the selected geodetic system information on a film together with time information and position information.

Figure 12:
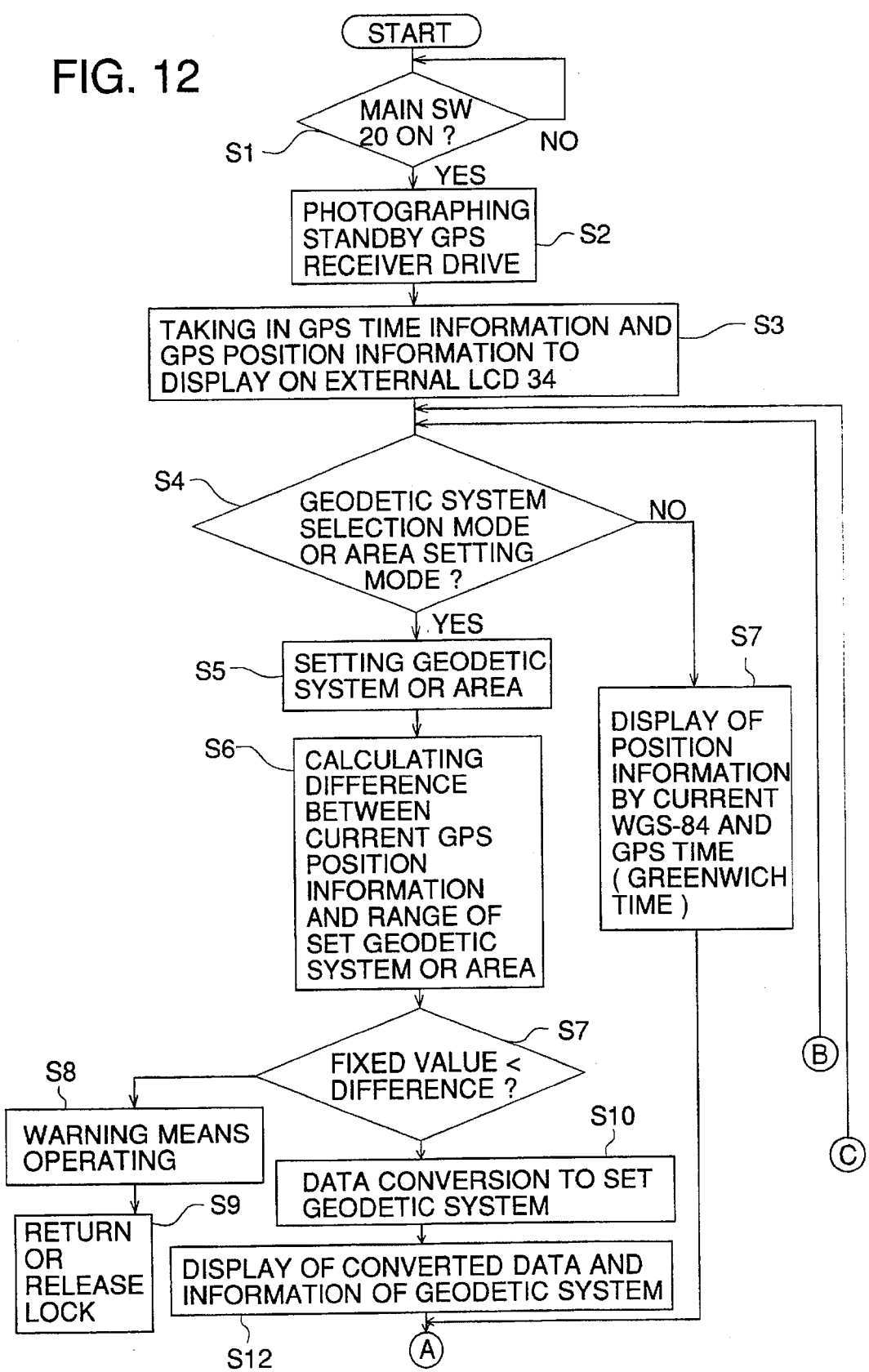
FIG. 12 is a flow chart showing operations of the third example of the invention.
Figure 13:
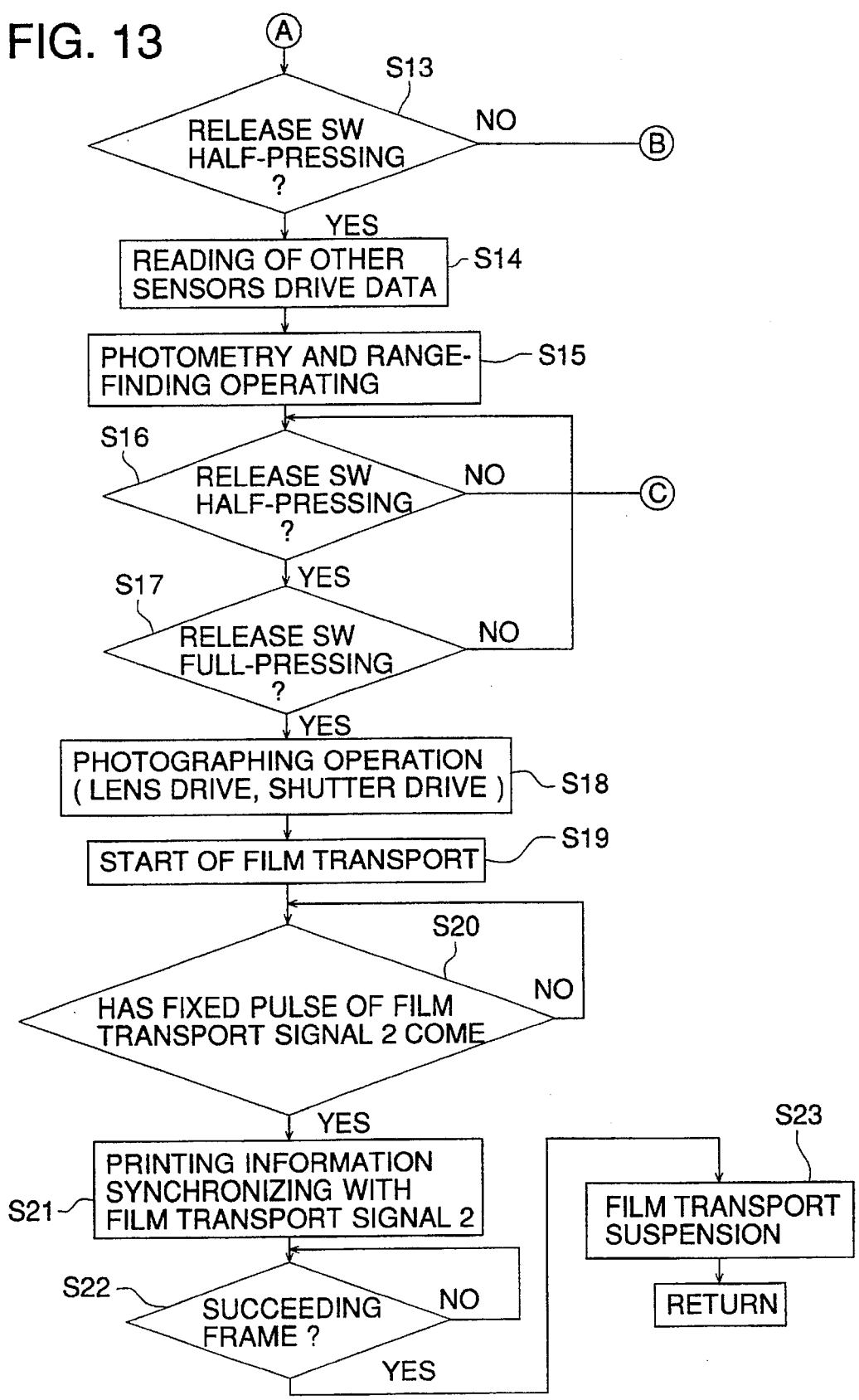
FIG. 13 is a flow chart showing operations of the third example of the invention.

Each of FIGS. 12 and 13 represents a flow chart showing operations of the second example of the invention. This will be explained as follows, in parallel with an explanation of examples of displays on LCD display section 34. When main switch 20 of a camera is turned on (S1), a camera performs flash charging and other operations to be ready for photographing. On the other hand, CPU 2 starts driving GPS receiving section 32 simultaneously (S2). Then, it receives electric waves from a satellite to take in information of time and position, and displays them on outer LCD display section 34 (S3).

CPU 2 further checks thereafter whether a geodetic system selecting mode is selected or an area setting mode is selected (S4). When the geodetic system selecting mode is selected or the area setting mode is selected, either (a) or (b) in FIG. 10 is displayed. When a user designates the geodetic system selecting mode or the area setting mode from key input section 35 in this case (S5), comparing section 41 in CPU 2 calculates a difference between a range of the designated geodetic system and GPS position information taken in currently or between a range of the designated area and GPS position information taken in currently (S6). Then, it compares the calculated difference with a prescribed value (standard value of errors) (S7). In discrimination work in this case, comparison is not made in detail, but an approximate maximum value and minimum value respectively of latitude and longitude for the designated area are stored, and judgment is made whether the position information coming from GPS differs remarkably from the stored values or not. For example, if the difference of 30° or more from the stored value gives warning, a predetermined value can be set to 30°.

When the difference obtained from calculation is greater than the predetermined value, CPU 2 drives sounding unit 39 to generate warning sound (S8). In the example, a sounding unit such as a buzzer is used, but it is also allowed to use an external indicating means or to use display section 18 in a viewfinder. Owing to this, it is possible to warn a user surely. Further, since wrong data are recorded undesirably in this case, return or release lock is performed (S9). By prohibiting photographing operations as in the foregoing, it is possible to prevent photographing in the wrong geodetic system.

When the difference obtained through calculation is smaller than a predetermined value in step S7, data converting section 40 in CPU 2 data-converts position information received from GPS receiving section 32 into position information of the set area system (S10). Then, the converted position information data and information of the geodetic system are displayed on LCD display section 34 (S12).

Incidentally, when neither geodetic system selecting mode nor area setting mode is selected in step S4, position information based on present WGS-84 and GPS time (Greenwich time) are displayed (S13). In the case of the third example, as stated above, when the set or selected area is extremely different from the reception position information, a sounding unit that gives warning is provided. Thereby, when the area is extremely different from reception position information, the warning means gives warning so that wrong area may not be selected.

Since the operations after succeeding step S14 are the same as those in the first and second examples, explanation therefor will be omitted.

In the examples stated above, data to be printed are indicated with characters and numerals which can be recognized as they are. However, other indicating methods such as a dot indication or the like can also be employed.

Effects of the invention explained above are itemized as follows.

(1) A geodetic system can be selected, and display and recording not only at the geodetic system of WGS-84 but also at the geodetic system matching with the measurement location are possible, thereby data conversion is not needed even for comparison with a map. In addition, recorded data and the geodetic system to which the recorded data belong are both recorded, which causes no confusion even after a time.

(2) Since it is possible to switch to the local time in terms of display and to switch to the geodetic system of an area simultaneously by setting the area, operations can be simplified and erroneous setting can be prevented.

(3) Furthermore, in the case of erroneous setting caused by wrong operations, this is judged by a judging means, and warning is given or release lock is operated. Thus, erroneous use can be prevented.

Due to the effects mentioned above, reliability of the contents recorded by a data recording unit in a camera of the invention can be improved greatly.

As stated in detail above, the first example makes it possible to make the recorded data and the geodetic system to correspond surely to each other by recording the position information converted by the aforesaid data converting means with a recording means based on geodetic system information selected by the above-mentioned geodetic system selecting means.

In this case, under the condition that a geodetic system information outputting means that outputs information of the geodetic system selected by the aforesaid geodetic system selecting means is provided, it is possible to make the recorded data and the geodetic system to correspond surely to each other by recording information of the geodetic system selected by the aforesaid geodetic system selecting means together with data-converted position information with a recording means based on the selected geodetic system.

By providing a display means that displays at least one of the geodetic system selected by the aforesaid geodetic system selecting means and the data-converted position information, it is further possible to compare and consult between the position information and the geodetic system.

The second example makes it possible to make the recorded data (corrected time information and the converted position information) and the geodetic system to correspond surely to each other by outputting, with a time information outputting means, the corrected time information, corresponding to the area set by an area information setting means, and by outputting, with a converted position information outputting means, the converted position information in the geodetic system, corresponding to the set area, and further by recording them with the aforesaid recording means.

In this case, it is possible to display time information and position information so that both of them may correspond to each other, by displaying corrected time information and converted position information when the area is set by the aforesaid area information setting means, and by providing a display means that displays the aforesaid GPS time information and the position information based on WGS-84 when the area information is not set.

In the third example, when there are provided a comparing means which compares the area set or selected by an area information setting means or by a geodetic system selecting means with received position information obtained by a GPS receiver, and a warning means which gives warning when the set or selected area differs from the received position information greatly, wrong selection of the area can be prevented because the warning means gives warning when the area is greatly different from the received position information.

In this case, it is possible for the aforesaid warning means to let a user know surely about the warning by warning in the manner of either displaying a warning message or making a warning sound.

The aforesaid warning means can prevent photographing and recording under the wrong geodetic system by warning in the manner of prohibiting photographing operations of a camera.

What is claimed is:

1. A data recording unit for use with a camera for recording on a recording medium, information data obtained by a GPS receiver, comprising:
   selection means for selecting a geodetic system from a plurality of geodetic systems;
   data conversion means for converting position information data, obtained by said GPS receiver, to converted position information data in the selected geodetic system; and
   recording means for recording said converted position information data on said recording medium together with images photographed by said camera.

2. The data recording unit of claim 1, further comprising:
   geodetic system information outputting means for outputting geodetic system information corresponding to the selected geodetic system, said recording means recording on said recording medium said geodetic system information together with said converted position information data.

3. The data recording unit of claim 1, further comprising: display means for displaying at least one of said selected geodetic system and said converted position information data.

4. A data recording unit for use with a camera for recording on a recording medium information data obtained by a GPS receiver, comprising:
   first outputting means for outputting position information data and GPS time information according to signals received by said GPS receiver;
   setting means for setting area information;

time information conversion means for converting said GPS time information to local time corresponding to said set area information;

second outputting means for outputting said local time;

data conversion means for converting said position information data to converted position information data expressed in a geodetic system corresponding to said set area information; and recording means for recording on said recording medium, said local time and said converted position information data together with images photographed by said camera.

5. The data recording unit of claim 4, further comprising:

display means for displaying said local time and said converted position information data when said area information is set by said setting means, and for displaying time and position information data corresponding to a geodetic system of WGS-84 when said area information is not set by said setting means.

6. A data recording unit in use with a camera for recording on a recording medium, information data obtained by a GPS receiver, comprising:

first outputting means for outputting position information data according to signals received by said GPS receiver, setting means for setting at least one of area information and a geodetic system;

calculation means for calculating difference between said position information data and area data corresponding to at least one of said set area information and said set geodetic system, said calculation means generating a difference signal corresponding to the calculated difference; and warning means for issuing a warning when said difference signal is greater than a predetermined value.

7. The data recording unit of claim 6, wherein said warning means includes at least one of display means for displaying a warning message and generating means for generating a warning sound.

8. The data recording unit of claim 6, wherein said warning means includes prohibition means for prohibiting a photographing operating of said camera.

* * * * *